United States Patent
Zlotek

[11] Patent Number: 5,285,950
[45] Date of Patent: Feb. 15, 1994

[54] WIRE SPRAG RETAINER

[75] Inventor: Thaddeus Zlotek, Centerline, Mich.

[73] Assignee: Dana Corporation, Toledo, Ohio

[21] Appl. No.: 717,744

[22] Filed: Jun. 19, 1991

[51] Int. Cl.⁵ .................... B23K 101/30; F16D 41/07
[52] U.S. Cl. .............................. 228/189; 29/898.065;
    188/82.1; 192/45.1
[58] Field of Search ............ 228/189, 144, 158, 173.5;
    188/82.1, 82.77; 192/45.1, 41 A; 29/898.065

[56] References Cited

U.S. PATENT DOCUMENTS

| | | | |
|---|---|---|---|
| 2,534,379 | 12/1950 | Schreiber | 29/898.065 |
| 2,591,160 | 4/1952 | Kilian | 228/144 |
| 2,812,839 | 11/1957 | Cobb | 192/45.1 |
| 2,927,671 | 3/1960 | Sand | 192/45.1 |
| 3,051,534 | 8/1962 | Kohler et al. | 29/898.065 |
| 3,075,278 | 1/1963 | Bratt | 29/148.4 |
| 3,353,246 | 11/1967 | Farmer | 29/898.067 |
| 4,252,221 | 2/1981 | Lanzerath et al. | 192/41 A |
| 4,360,093 | 11/1982 | Wakabayashi et al. | 192/41 A |
| 4,373,620 | 2/1983 | Zlotek | 192/41 A |
| 4,494,636 | 1/1985 | Wakabayashi et al. | 192/41 A |
| 4,809,831 | 3/1989 | Kinoshita | 192/41 A |
| 4,928,801 | 5/1990 | Laurent | 192/45.1 |
| 5,064,037 | 11/1991 | Long, Jr. | 192/45.1 |

FOREIGN PATENT DOCUMENTS

| | | | |
|---|---|---|---|
| 1203289 | 1/1960 | France | 192/45.1 |
| 1225516 | 7/1960 | France | 192/45.1 |
| 2385948 | 10/1978 | France | |
| 796428 | 6/1958 | United Kingdom | 29/898.065 |
| 2061418 | 5/1981 | United Kingdom | |

Primary Examiner—Kurt C. Rowan
Assistant Examiner—Jeanne M. Elpel
Attorney, Agent, or Firm—Dykema Gossett

[57] ABSTRACT

A low-cost sprag retainer is disclosed which is particularly useful in high volume applications. The retainer is formed of two generally linear wire portions which are spaced by a first distance. Cross members are placed across the linear members, spanning the first distance and then secured to the linear members. The linear members are then rolled upon themselves such that their ends meet in abutting contact to form rings. The ends are then welded together. The method of the present invention reduces production complexity for sprag retainers in high volume applications.

11 Claims, 2 Drawing Sheets

5,285,950

WIRE SPRAG RETAINER

BACKGROUND OF THE INVENTION

This application in general relates to low-cost retainer for sprag clutches, and more particularly to a simplified method of forming such low-cost retainers.

Sprag clutches are known in the art and used to selectively transmit rotation between two shafts. A first shaft is connected to an inner race received at an inner periphery of a clutch assembly, and a second shaft is connected to an outer race at the outer periphery. The clutch assembly consists of a number of transmission members, commonly known as sprags, which selectively transmit rotation between the inner and outer races. A sprag retainer may receive the sprags and maintain them in a proper position. In the prior art, sprag retainers have often been punched from metal, and have been relatively complicated to produce.

The prior art discloses the concept of welding cross members to ring members to form a sprag retainer. This type of method is still somewhat complex, however, and it is desirable to achieve a simpler method of forming such sprag retainers.

SUMMARY OF THE INVENTION

In a disclosed method, a sprag retainer is formed of two spaced ring-shaped members with cross member extending between the ring members, forming openings to receive the sprags. The ring and cross members are preferably formed of wire.

In a disclosed method, generally linear elongated members are spaced from each other by a first distance. Cross members are secured to the linear members at spaced locations along a distance between first and second ends of the linear members. The linear members are then rolled such that the ends of each linear member are brought into abutting contact. The respective ends of the two linear members are then welded together to form rings. Attaching the cross members to linear members rather than rings, as in the prior art, makes it relatively simple to properly space and secure the cross members. This is particularly useful in high volume applications.

The cross members are preferably at the inner periphery of the rings. The linear members and the cross members are preferably predrawn wire, which may be in a variety of cross-sectional shapes. They are preferably of the same cross-section, thus reducing the number of different types of parts which are necessary to form the inventive sprag retainer.

These and other features of the present invention can be best understood from the following specification and drawings of which the following is a brief description.

DETAILED DESCRIPTION OF A PREFERRED EMBODIMENT

Figure 1:
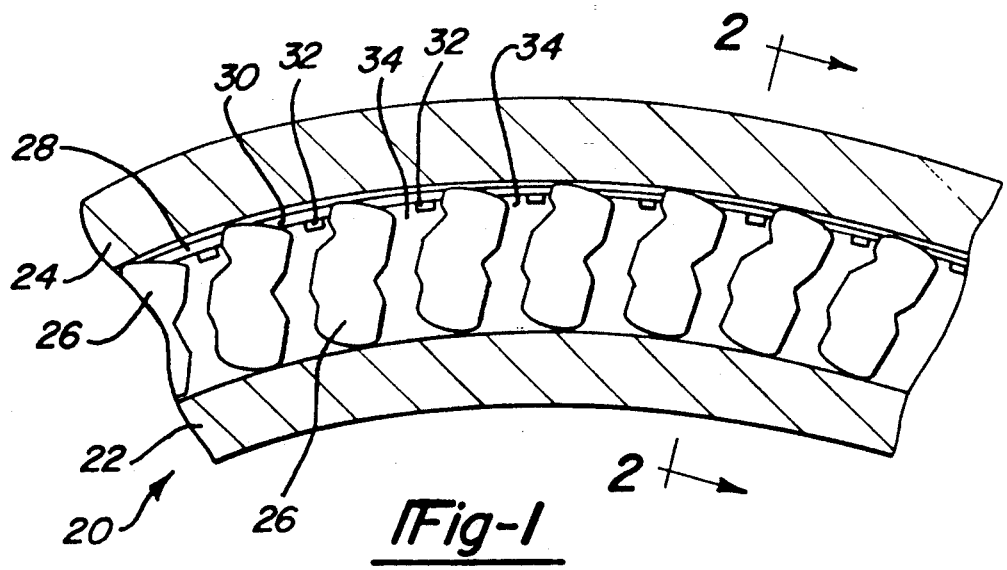
FIG. 1 is a cross-sectional view through a sprag clutch embodying the inventive retainer.

Sprag clutch 20 is illustrated in FIG. 1 for transmitting rotation between inner race 22 and outer race 24. Sprags 26 are received in a sprag retainer 28 which maintains them in a proper position relative to the races 24 and 22 to selectively transmit rotation. Retainer 28 is formed by a pair of ring members, one of which 30 is illustrated in this figure, and cross members 32 which extend between the two ring members. The cross members 32 and the ring members form openings 34 which receive sprag 26. The outer diameter of ring 30 is approximately equal to the inner diameter of outer race 24.

Figure 2:
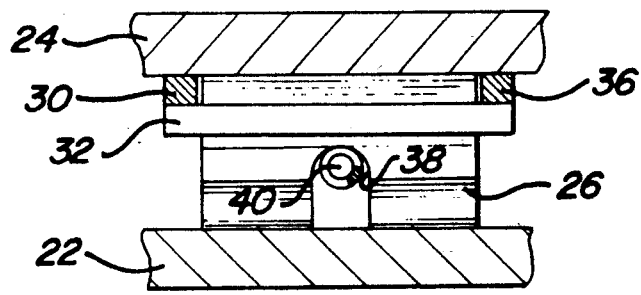
FIG. 2 is a partial cross-sectional view along line 2—2 as shown in FIG. 1.

FIG. 2 is a cross-sectional view along line 2—2 as shown in FIG. 1. Sprag 26 contacts an inner peripheral surface of outer race 24 and an outer peripheral surface of inner race 22. Cross members 32 and rings 30 and 36 retain sprags 26 in a proper orientation relative to races 22 and 24. Sprag 26 includes center notch 38 which receives energizing spring 40.

Figure 3:
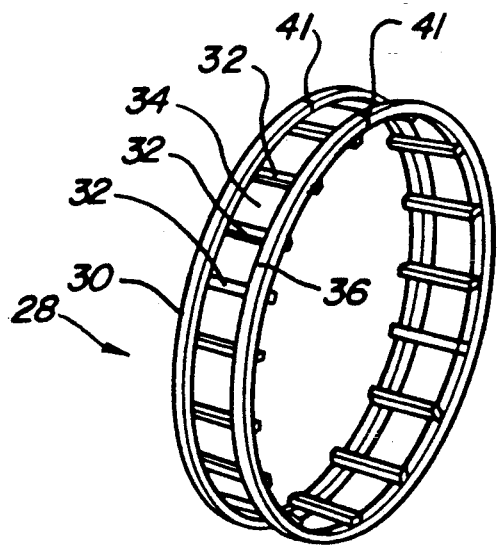
FIG. 3 is a perspective view of a sprag retainer according to the present invention.

FIG. 3 is a perspective view of sprag retainer 28 according to the present invention. Rings 30 and 36 and cross member 32 form openings 34. Cross members 32 extend across the distance between rings 30 and 36 at an inner peripheral surface. Rings 30 and 36 have weld joint 41 where they were secured into the ring shape.

Figure 4:
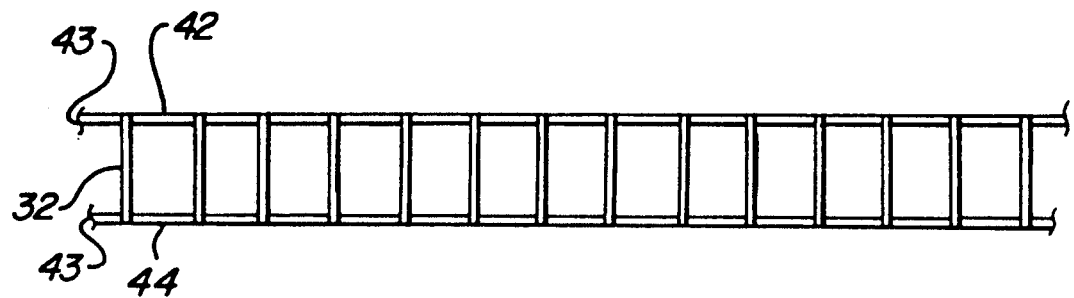
FIG. 4 is a plan view of the first step in forming the sprag retainer shown in FIG. 3.

FIG. 4 shows a first step in a method of forming retainer 28. A pair of linear members 42 and 44 are spaced from each other by a first distance. Members 42 and 44 are preferably parallel to each other and extend between ends 43 and 45. Cross members 32 are placed across linear members 42 and 44 and secured. Preferably an indexing tool properly spaces the cross members. It is preferred that cross members 32 are welded to linear members 42 and 44. Most preferably they are resistance, electron beam or laser welded.

Although the disclosed method includes the step of placing cross members 32 across both linear members 42 and 44 and then welding them to the two members, it should be understood that other sequences of those steps would come within the scope of this invention. As an example, cross members 32 could be welded to one of the two linear members, and then placed on the other and welded. Also, the cross member could be aligned and the linear members placed over them.

Figure 5:
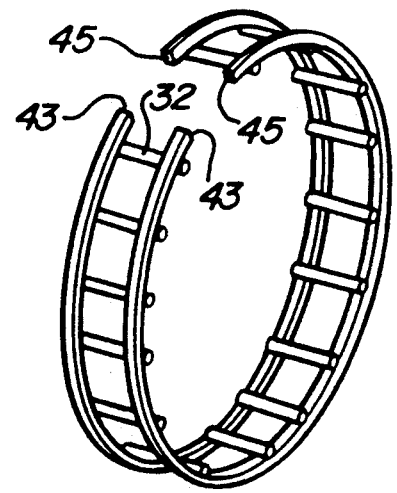
FIG. 5 is a step subsequent to that illustrated in FIG. 4.

Once cross members 32 have been secured to the linear members 42 and 44, the linear members are rolled upon themselves such that their respective ends 43 and 45 approach each other as shown in FIG. 5. Preferably, a known roller arrangement is used. Ends 43 and 45 are brought into abutting contact with each other and welded together. Butt resistance welding is preferred, although laser welds may be used. In this way, retainer 28 and joint 41, see FIG. 3, is formed. Also, rolls of retainer material could be formed in this way, cut to size, and then rolled into the final retainers. This would also allow freedom in selecting the diameter of the rings.

Once retainer 28 is formed, sprags are inserted into the spaces 34 between adjacent cross bars, see FIG. 1. The assembled retainer and sprags is inserted between an inner race 22 and outer race 24.

The retainers are preferably formed of pre-drawn wire. This wire may be round, square, or any other convenient shape. Further, it may be desirable to shape the cross members such that sprag opening 34 is formed by spaced parallel walls of adjacent cross members. This may require the cross member to have a non-rectangular section. The cross bars and rings are preferably of the same cross section, and may be on the order of 0.040 inches across.

Although ends 43 and 45 are shown secured, they may be left unsecured. Their springiness still retains them in the proper location.

A preferred embodiment of the present invention has been disclosed, however, a worker of ordinary skill in the art would recognize that certain modifications would come within the scope of this invention. For that reason the following claims should be studied in order to determine the true scope and content of this invention.

I claim:

1. A method of forming a sprag retainer comprising the steps of:
   (i) placing two generally linear members parallel to each other, and spaced by a first distance, the members each extending between first and second ends;
   (ii) placing cross members across the two generally linear members such that the cross members are spaced between the first and second ends, and generally parallel to each other;
   (iii) securing the cross members to the linear members;
   (iv) bringing the respective first and second ends of the two linear members together to form rings, the ends of the two linear members being brought together in a direction such that the cross members are at an inner peripheral surface of the rings; and
   (v) securing the respective first and second ends of the two linear members.

2. The method as recited in claim 1, wherein the securing of steps (iii) and (v) is by welding.

3. The method as recited in claim 1, wherein the cross members are initially placed across both generally linear members, and then secured to the two linear members.

4. The method as recited in claim 1, wherein the cross members and the linear members have generally the same cross section.

5. The method as recited in claim 4, wherein the cross section is circular.

6. The method as recited in claim 4, wherein the cross section is generally rectangular.

7. A method of forming a sprag retainer comprising the steps of:
   (i) placing two generally linear members parallel to each other, and spaced by a first distance, the members each extending between first and second ends;
   (ii) placing cross members across the two generally linear members such that the cross members extend generally parallel to each other;
   (iii) securing the cross members to the two generally linear members;
   (iv) bringing the respective first and second ends of the two linear members together to form rings; and
   (v) and wherein spaces between adjacent cross members define openings to receive sprag members.

8. The method as recited in claim 7, wherein the further step of securing the respective first and second ends of the two linear members is included.

9. The method as recited in claim 7, wherein the cross members are placed on the linear members in step (ii).

10. A method of making a sprag clutch having an inner race and an outer race comprising the steps of:
    (i) placing two generally linear members parallel to each other, and spaced by a first distance, the members each extending between first and second ends;
    (ii) placing cross members cross the two generally linear members such that the cross members are spaced between the first and second ends and form openings, and generally parallel to each other;
    (iii) securing the cross members to the linear members;
    (iv) bringing the respective first and second ends of the two linear members together to form rings, the ends of the two linear members being brought together in a direction such that the cross members are at an inner peripheral surface of the rings;
    (v) securing the respective first and second ends of the two linear members to form a retainer;
    (vi) inserting the retainer between the inner race and the outer race; and
    (vii) inserting sprags in the openings of the retainer.

11. A method of making a sprag clutch having an inner race and an outer race comprising the steps of:
    (i) placing two generally linear members parallel to each other and spaced by a first distance, the members each extending between first and second ends;
    (ii) placing cross members across the two generally linear members such that the cross members extend generally parallel to each other;
    (iii) securing the cross members to the two generally linear members;
    (iv) bringing the respective first and second ends of the two linear members together forming a retainer in the shape of a ring and wherein spaces between adjacent cross members define openings for receiving sprag members;
    (v) inserting the retainer between the inner race and the outer race; and
    (vi) inserting sprag members in the openings of the retainer.

* * * * *

UNITED STATES PATENT AND TRADEMARK OFFICE
CERTIFICATE OF CORRECTION

PATENT NO. : 5,285,950
DATED : February 15, 1994
INVENTOR(S) : Thaddeus Zlotek It is certified that error appears in the above-identified patent and that said Letters Patent is hereby corrected as shown below:

Column 4, line 20, the second occurrence of "cross", replace with --across--.

Signed and Sealed this

Twelfth Day of July, 1994

Attest:

BRUCE LEHMAN

Attesting Officer

Commissioner of Patents and Trademarks